United States Patent [19]

Benson

[11] 4,087,265

[45] May 2, 1978

[54] APPARATUS AND METHOD FOR CHILLING SEAFOOD PRODUCTS

[75] Inventor: Ernest J. Benson, Berkeley Heights, N.J.

[73] Assignee: Benson Equipment Co., Inc., Berkely Heights, N.J.

[21] Appl. No.: 742,591

[22] Filed: Nov. 19, 1976

[51] Int. Cl.² .............................................. F25D 13/06
[52] U.S. Cl. .......................................... 62/63; 62/68; 62/380; 62/384
[58] Field of Search ................. 62/62, 63, 64, 68, 332, 62/379, 380, 384, 373, 374, 375, 376, 76, 10, 35, 48

[56] References Cited

U.S. PATENT DOCUMENTS

| | | | |
|---|---|---|---|
| 2,516,166 | 7/1950 | Wiczer | 62/76 |
| 3,172,769 | 3/1965 | Horan | 62/62 |

Primary Examiner—Ronald C. Capossela
Attorney, Agent, or Firm—Stefan J. Klauber

[57] ABSTRACT

Apparatus and method are disclosed for continuously processing seafood products, to rapidly chill such products for subsequent freezing or for fresh shipment. Container means are provided for receiving the food product together with an aqueous bath for enveloping such product. The container means, which may comprise a plurality of trays or buckets, are carried by a conveyor belt means from the input to output end of the apparatus. Means overlying the moving containers deposit a frozen $CO_2$ cloud into the aqueous enveloping bath to thereby render such bath an ice-water slurry. Means are further provided for agitating the ice-water slurry in the container means during movement through the apparatus, to promote uniformity in the enveloping bath and to promote cooling contact between the food product and the enveloping slurry. Food products are thereby chilled at typical rates in the range from about 1° F per half-second to 1° F per 8 seconds, with e.g. a relatively optimal rate of about 1° F per 4 seconds being achieved for a typical food product, such as a medium size oyster.

6 Claims, 5 Drawing Figures

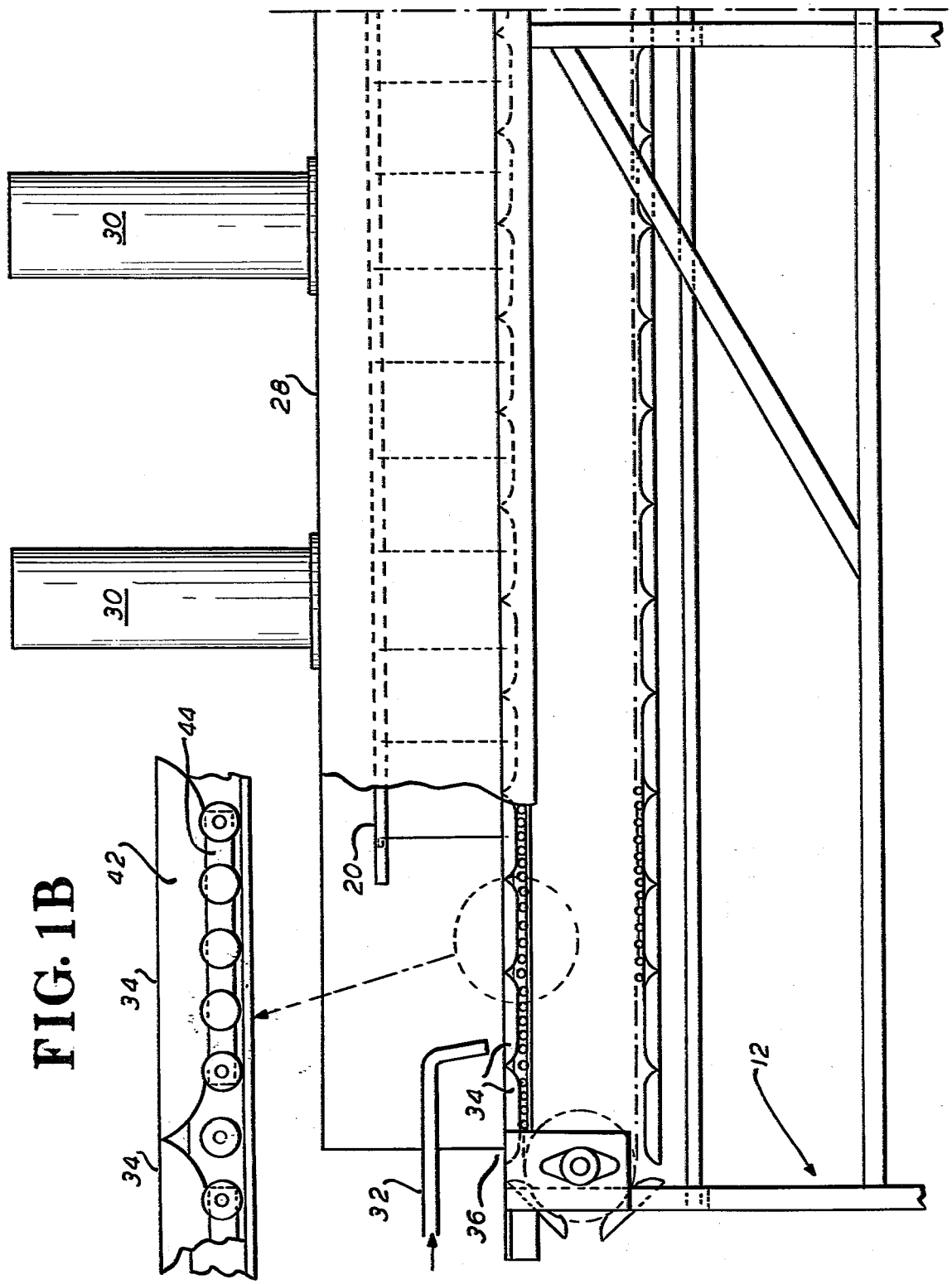

4,087,265

APPARATUS AND METHOD FOR CHILLING SEAFOOD PRODUCTS

BACKGROUND OF INVENTION

This invention relates generally to food processing apparatus and methodology, and more specifically relates to apparatus and methods for chilling food products, particularly seafood products.

Seafood products, such as oysters, clams and the like, are highly sensitive and perishable foods, requiring stringent processing conditions, and a high degree of care in shipment thereof. Adherence to such rigid processing schedules and maintenance of the food products at specified conditions during shipment is important in order to provide good texture and quality in the food product, and is a necessity as well from a strictly hygienic viewpoint — i.e. in order to assure that the products do not become contaminated with undesired bacteria or so forth. Indeed in the latter connection various laws and regulations have been promulgated pursuant to or in conformance with Federal or State-established standards. For example, in many instances a requirement is thus imposed that fresh oysters must be emplaced in their shipping containers and be thereafter maintained at 40° F or lower.

Pursuant to the foregoing, much interest has centered in apparatus and methodology for chilling freshly caught and processed seafood, such as oysters, clams or the like, to bring these products to a desired low temperature, e.g. typically 40° or less, whereat they can be further processed — as by a subsequent freezing step, or by direct emplacement in containers for shipping as fresh product. Among other things it is significant in chilling products of the mentioned type to bring the product as rapidly as possible to the desired chilled temperature. This in order to avoid damaging or harm to the product flesh, and to avoid loss of volume and other detrimental effects.

Various techniques have been used in the past to achieve the relatively rapid chilling above mentioned. For example, conventional mechanical refrigeration has been employed for such purposes, but this is a relatively expensive operation, particularly if large installations are involved — as is the case in the seafood industry. Similarly, simple ice and water baths have been used for such purpose, but prior techniques based on such approach have again been relatively expensive, and it has been found further that conventional ice and water baths tend to damage the product, and cause loss of yield.

SUMMARY OF INVENTION

Now in accordance with the present invention, apparatus and method are provided enabling efficient and highly effective chilling of seafood products, such as oysters, clams or the like.

Apparatus in accordance with the invention may include container means adapted for receiving a food product at the input end of the apparatus, which container means also receive an aqueous bath for enveloping the food product. Conveyor means are provided for moving the container means from the input to output ends of the apparatus; and means such as a "snow horn" or the like, overlie the conveyor means, and enable deposit of a frozen $CO_2$ cloud or "snow" into the enveloping bath at the container means during movement of the latter through the apparatus. In consequence the aqueous enveloping bath within the container means is rendered into an ice-water slurry, which thus completely and effectively envelops the food product. Means are additionally provided for agitating the thus formed slurry in its container means, during movement through the apparatus. This agitation may, for example, be brought about by a plurality of flexible fingers, positioned in overlying relationship to the conveyed container means, which fingers dip into the enveloping ice-water slurry bath and agitate same during container movement through the apparatus. This agitation promotes uniformity in the enveloping slurry bath, and promotes cooling contact between the food product and slurry.

Pursuant to the invention, a typical product, such as fresh oysters provided to the apparatus at 55° to 60° F, may be rapidly brought to a typical range of 36° to 40° F without freezing the flesh thereof or otherwise damaging the said product. In a typical such procedure wherein medium size oysters are so chilled, a cooling rate of the order of 1° per 4 seconds may be achieved and utilized. More generally, pursuant to the invention and by the techniques set forth, a cooling rate between from about 1° F per half-second, and 1° F per 8 seconds, is achieved.

BRIEF DESCRIPTION OF DRAWINGS

The invention is diagrammatically illustrated, by way of example, in the drawings appended hereto, in which:

FIGS. 1A and 1B taken together, are a side elevational view, schematic in nature, of apparatus in accordance with the present invention;

DESCRIPTION OF THE PREFERRED EMBODIMENT

Figure 1A:
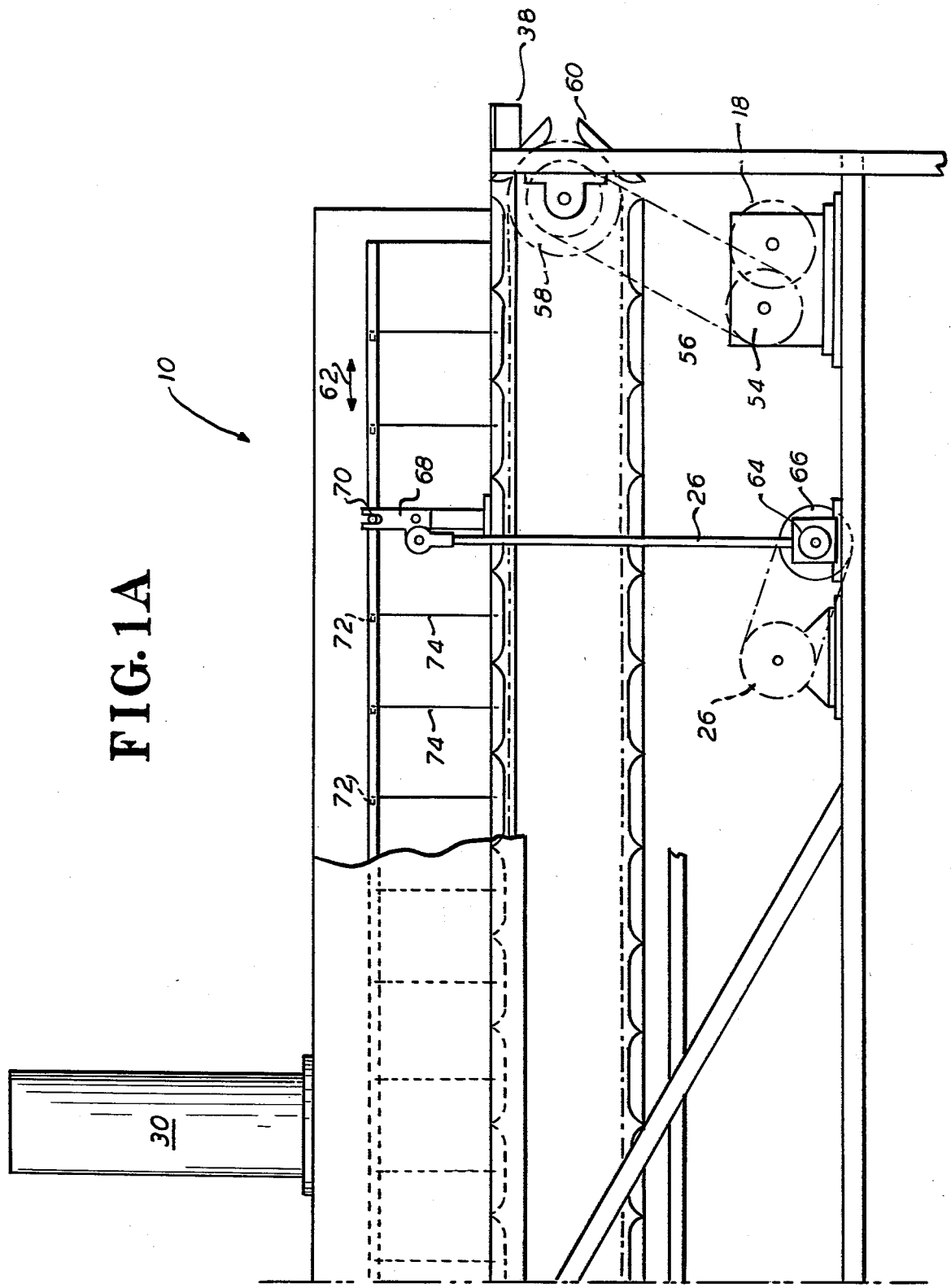

In FIGS. 1A and 1B, 2 and 3 herein, apparatus 10 is set forth in accordance with the present invention. Apparatus 10 is particularly suitable for use in chilling of seafood products, particularly oysters, and the application of said apparatus will be largely described in terms of such use. It will be understood, however, from the description to be set forth, that the said apparatus can be used in the cooling or chilling of other food products as may be required or desired.

Apparatus 10 is seen to include a support frame 12 which extends substantially the entire length of such apparatus. Frame 12 carries a conveying means in the form of conveying chains 14 and 16; a drive motor 18 for the conveying chains; an agitator assembly, generally indicated at 20; a motor 24 and drive linkage 26 for actuating the assembly 20; an enclosure 28 overlying the upper portions of apparatus 10, and carrying a series of snow horns 30; plus additional elements necessary to the operation of the said apparatus, including, for example, a feed water inlet 32 for providing water to a plurality of individual containers 34. The latter take the form of trays or buckets, which are conveyed by chains 14 and 16, and carry the food product to be treated in apparatus 10, from the input end 36 of such apparatus, to the output end 38 thereof.

Figure 4:
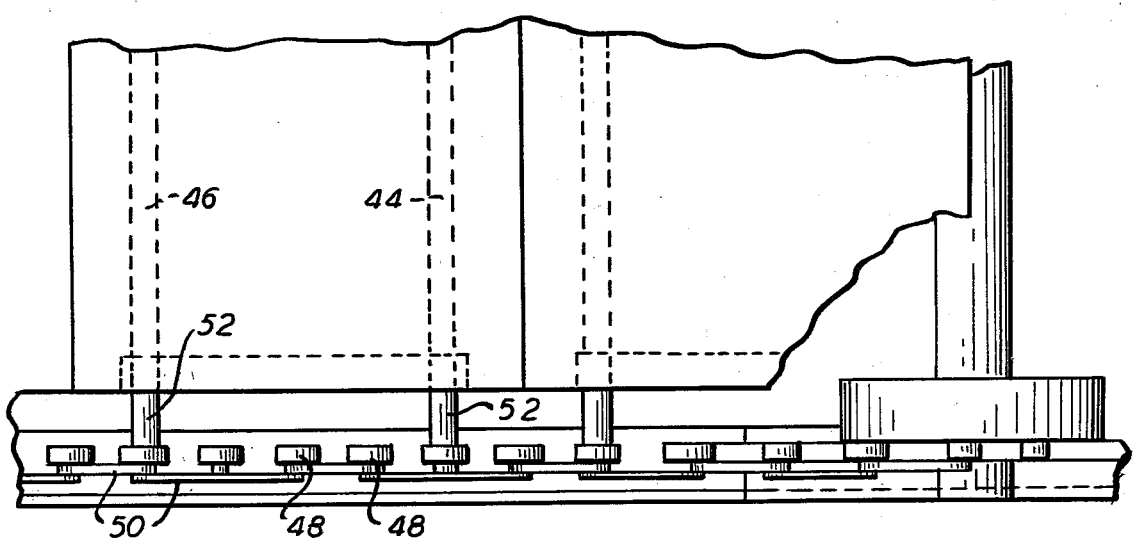
FIG. 4 is an enlarged plan view, partially broken away of the portion of the FIG. 3 apparatus depicted within the dotted circle identified in the latter Figure.

Containers 34 are shallow trays or buckets (as is particularly evident from the enlarged portion of FIG. 1B), and include a trough portion 40 and an underlying base portion 42. Base portion 42 is provided with two passageways 44 and 46, extending transversely through the trays (FIG. 4). These passageways enable mounting of the trays on conveying chains 14 and 16. In particular, such chains may be of the so-called "hollow pin" type (available e.g. from Rexnord Corp.). This type of chain carrier 14 (FIG. 4) is characterized by a series of rollers 48 interconnected by links 50. Carrier rods 52 extend from a hollow interior or core of selected rollers 48, and proceed through passageways 44, 46 in base portion 42 of containers 34, and thence engage at corresponding roller opening at chain 16 on the opposed side of the container. Thus containers 34 are conveyed by the pair of carrier chains 14, 16 by means of the rods 52 passing through the base portion 42 of such containers.

The carrier chains 14, 16 are driven by a motor 18 as mentioned, via sprocket 54, drive chain 56, and a drive sprocket 58. It is thus clear that the plurality of trays or containers 34 pass from the input end 36 of apparatus 10 at the left end of FIG. 1B to the output end 38 at the right end of FIG. 1A, and thence in their continued progression are inverted at 60, and then pass backward to input end 36 by proceeding in inverted fashion underneath the apparatus. In such progression, i.e. beneath apparatus 10, they are prevented from falling by the aforementioned carrier rods 52 which support same between the conveying chains 14 and 16.

In general, the mode of treatment of food products in the present apparatus is such that the food product is deposited at input end 36 of the apparatus, as by any convenient means. This may include deposit from a shucking device for oysters or the like, which device is not shown herein; or the said oysters or similar product can in principle be manually deposited into containers 34 at the input end 36 of the said apparatus. The product then proceeds from left to right in the sense of FIGS. 1A and 1B, and upon the individual trays or containers passing toward the output end 38 of the apparatus, they are inverted and the contents thereof are released to any convenient underlying catching device, i.e. trays or buckets or so forth, which may be emplaced to receive the contents as they are dropped upon inversion of the trays.

Pursuant to a further aspect of the present invention, an enclosure 28 is provided in overlying relationship to the conveyed containers or trays, and generally encloses such trays in the course of their progression through apparatus 10. Enclosure 28 carries on its upper side a plurality of $CO_2$ cloud-dispensing devices or horns 30, which are mutually spaced with respect to one another along said apparatus. Three such devices are representatively shown, but the number may be larger or smaller, depending upon the specific application of the present device. These $CO_2$ cloud-dispensing devices, are well-known in the art under the term "snow horn", and are conventionally available commercial products which dispense a cloud of frozen carbon dioxide. Snow horns 30 of this type are, for example, available commercially from Airco, Inc., Cryogenics Division, Murray Hill, N.J.; and similar devices are available from other manufacturers.

In operation of the apparatus 10, and after the food product is deposited or loaded at input end 36, water through inlet 32 is provided to the interior of containers 34. The water is normally flowed in to a level sufficient to just cover the food products, i.e. it is desirable to not provide an excess of the water since this renders the chilling operation more difficult by virtue of increased volume of enveloping bath. In a typical application, e.g. the amount of water so used may be of the order of ¼ lb. water per pound of food product, where the food product is oysters.

The food product now carrying the enveloping bath proceeds to the right in the sense of FIGS. 1A and 1B. As containers 34 pass beneath the overlying snow horns 30 a cloud of frozen $CO_2$ is deposited onto the surface of the enveloping bath. The cloud proceeding from horn 30 is approximately in the shape of a cone, and hence it will be evident that as the trays or containers 34 proceed past the various overlying snow horns, they receive "shots" of the frozen $CO_2$ cloud, i.e. the density of the cloud level is decreased to a relatively low level in between the snow horns 30. This, in turn, provides a relatively economical application rate, i.e. effectively providing injection of the snow into the bath periodically.

Upon the frozen $CO_2$ snow entering the bath, the minute dry ice crystals in turn cause the formation of minute ice crystals. The net result is to provide a very fine ice-water bath in the form of a very fine slurry, or puree, within each of the tray containers 34. It is this fine slurry or ice-water puree which provides the efficient cooling in the present method and apparatus.

Pursuant to a further important aspect of the present invention, a continuous agitation method and means are provided, for agitating the ice-water slurry in the aforementioned containers 34. In particular, it will be seen that an agitating assembly 20 overlies frame 12, and is supported therefrom in floating fashion by slotted upright supports from frame 12, which enable the assembly 20 to move back and forth in the direction of arrow 62. The back and forth movement of the assembly 20 is enabled by means of eccentric 62 which is driven through drive sprocket 66 by motor 34. Eccentric 62, acting through link 26, link 68 and a pin 70 secured to assembly 20, moves the said assembly in the directions of arrows 62 in response to rotation of the drive motor.

Figure 2:
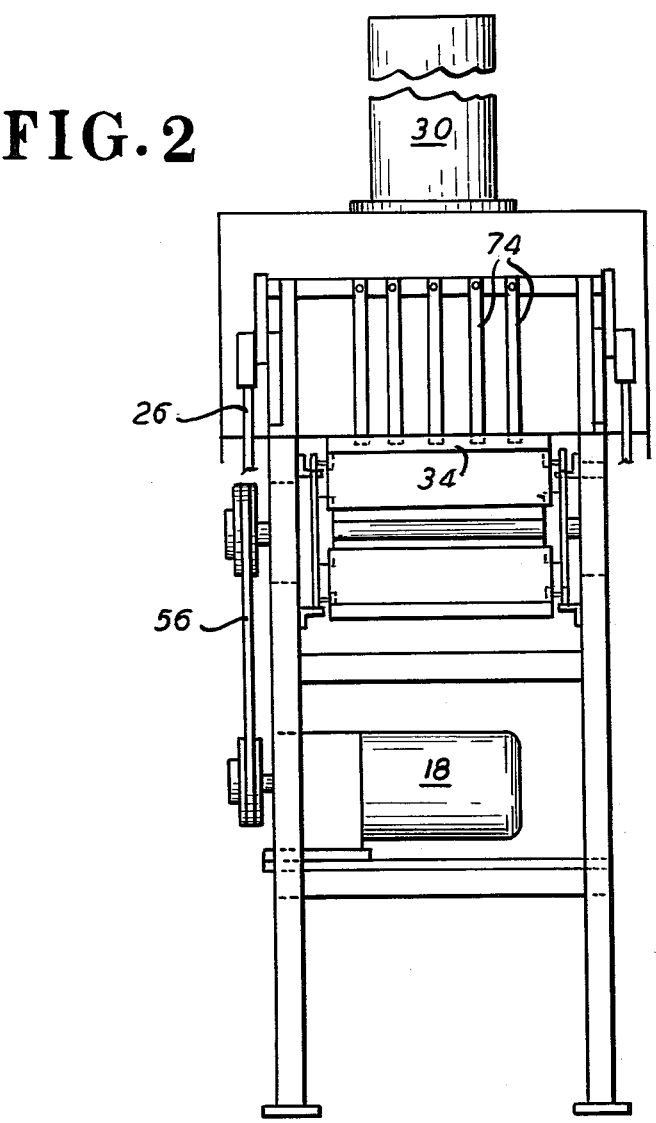
FIG. 2 is a right end elevational view of the FIGS. 1A and 1B apparatus.
Figure 3:
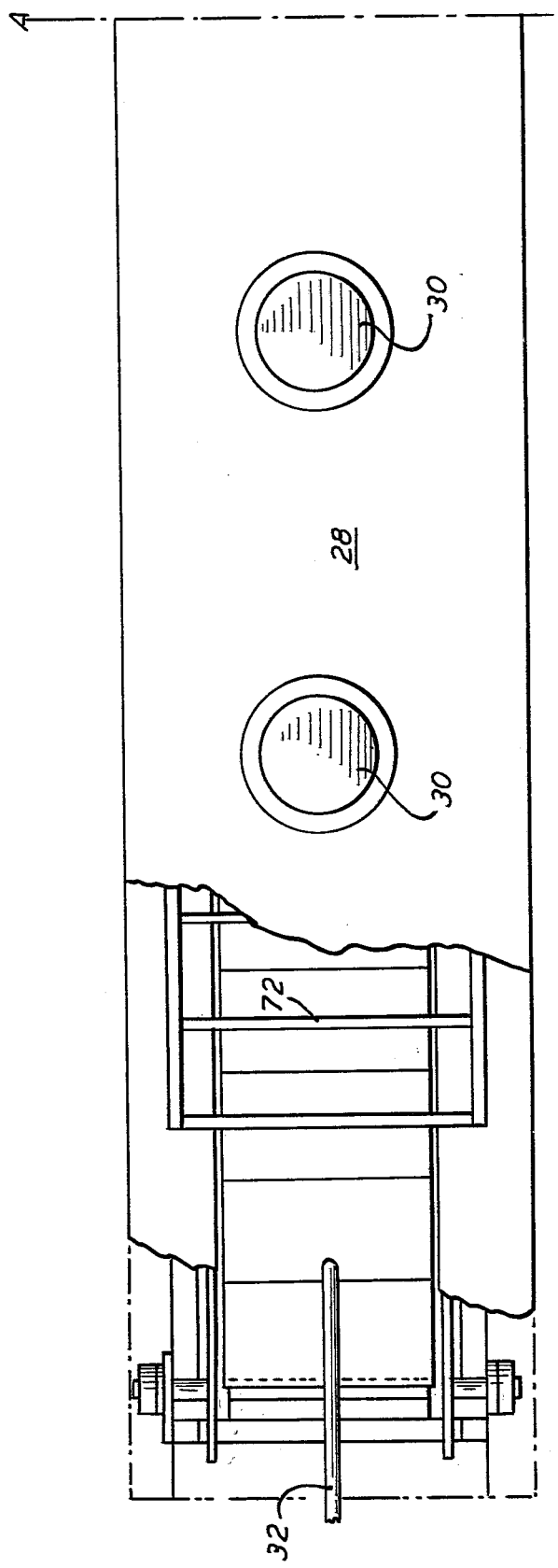
FIG. 3 is a top plan view of the FIGS. 1A and 1B apparatus, the Figure being partially broken away.
Figure 3:
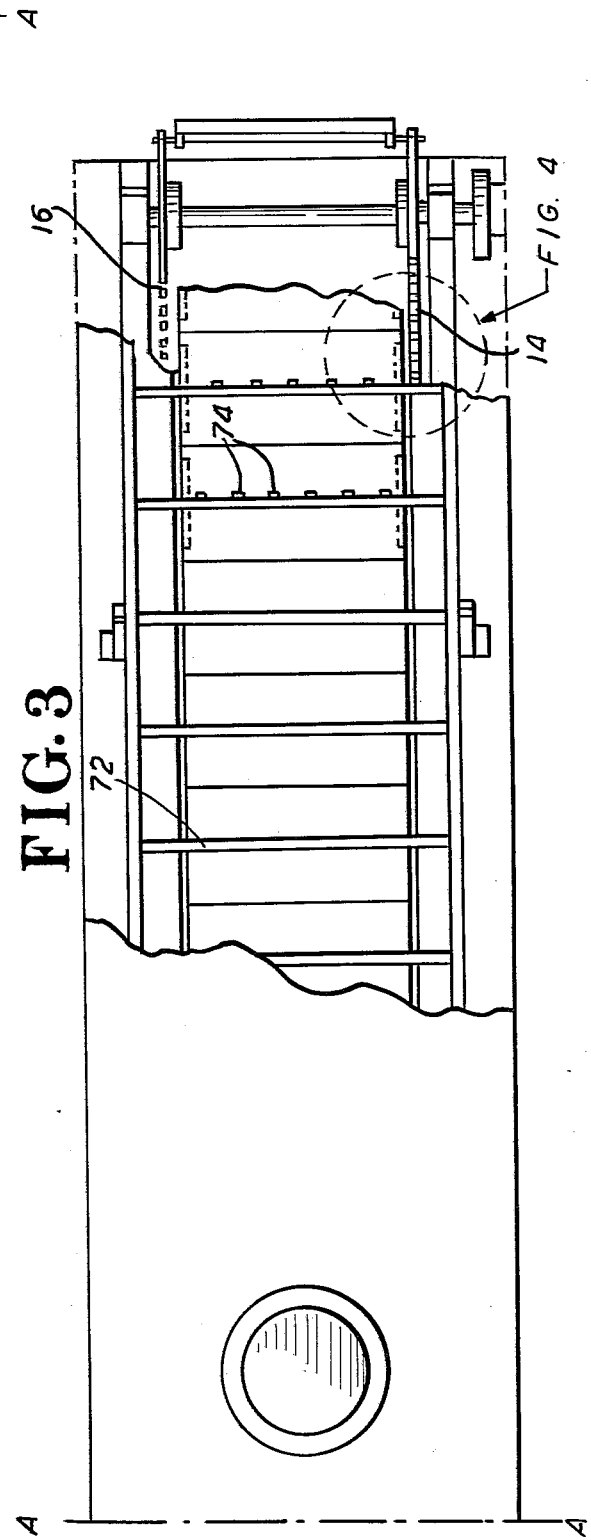

As best seen in FIG. 3, the agitating assembly 20 carries a series of cross members 72. Depending from members 72 are a plurality of agitating fingers 74 which preferably take the form of flexible plastic strips of teflon or similar resistant, tough, yet flexible material. As best seen in FIGS. 1A, 1B and 2, these fingers 74 are of such length as to dip into the contents of each tray container 34. The fingers 74 are agitated, again in the directions of arrow 62 by the mechanism just described, and hence furnish a means for continuously agitating the ice-water slurry or puree within the trays. This, in turn, provides continuous agitation of said slurry to promote uniformity therein, as well as to promote rapid cooling of the product by assuring good contact with the cooling slurry.

Pursuant to the method of the present invention, the food product typically is provided at the input end of the said apparatus at a temperature in the range of about 55° to 60° F. The product in passing through the apparatus from input end 36 to output end 38, is cooled or chilled at a rate in the approximate range of from about 1° per half-second, to about 1° per 8 seconds. In the case, for example, of a medium size oyster, which is a typical product considered by the invention, a cooling rate of about 1° per 4 seconds may be provided. The ice-water slush in all these instances will typically be at about 31° F. Under these conditions, the said product typically passes through apparatus 10 in a total time of about 60 to 192 seconds — and is chilled to a temperature of from about 36° to 40° F.

While the present invention has been particularly described in terms of specific embodiments thereof, it will be understood in view of the instant disclosure that numerous variations upon the invention are now enabled to those skilled in the art, which variations yet reside within the scope of the present teaching. Accordingly the invention is to be broadly construed and limited only by the scope and spirit of the claims now appended hereto.

I claim:

1. Apparatus for continuous processing a seafood product to rapidly chill said product; said apparatus comprising in combination:
    container means for receiving said food product at the input end of said apparatus, and for receiving an aqueous bath for enveloping said products;
    conveyor means for moving said container means from the input to output end of said apparatus;
    means for depositing a frozen $CO_2$ cloud into said enveloping bath at said container means during movement of said container means through said apparatus, to form at said container means an ice-water slurry enveloping said food product; and
    means for agitating said slurry in said container means during at least part of said movement through said apparatus, to promote uniformity in said enveloping bath, and to promote cooling contact between said food product and said enveloping slurry.

2. Apparatus in accordance with claim 1, wherein said means for depositing said $CO_2$ cloud, comprises a plurality of frozen $CO_2$ dispensing horns overlying said path of conveyance of said container means at said apparatus.

3. Apparatus in accordance with claim 1, wherein said agitating means comprises a plurality of flexible fingers overlying said conveyed container means, and extending into the contents of said container means; and means for moving said flexible fingers to and fro in said container means to agitate the contents thereof.

4. A method for rapidly chilling seafood products and the like, without freezing same, comprising the steps of:
    depositing said food product in an open top container; covering said food product with a water enveloping bath; depositing into said bath a cloud of frozen carbon dioxide to render said enveloping bath into the form of an ice-water slurry; and agitating said ice-water slush in said container to promote uniformity in said slurry and to promote chilling contact with said food product.

5. A method in accordance with claim 4, wherein said container carrying said food product and enveloping water bath are moved through an enclosure wherein said frozen $CO_2$ cloud is deposited onto the surface of said bath from an overlying source; and wherein agitation of said slurry is effected in said enclosure by fingers extending into said slurry and moved to and fro therein.

6. A method in accordance with claim 4, wherein chilling of said product is effected at a cooling rate of from between about 1° F per half-second to about 1° F per 8 seconds; and wherein said method is continued until a final chilled temperature in the range of from about 36° to 40° F is achieved.

* * * * *